United States Patent [19]

Lawrance

[11] 4,214,969

[45] Jul. 29, 1980

[54] LOW COST BIPOLAR CURRENT COLLECTOR-SEPARATOR FOR ELECTROCHEMICAL CELLS

[75] Inventor: Richard J. Lawrance, Hampstead, N.H.

[73] Assignee: General Electric Company, Wilmington, Mass.

[21] Appl. No.: 489

[22] Filed: Jan. 2, 1979

[51] Int. Cl.² .................... C25B 9/04; C25B 15/08; H01B 1/04; H01M 2/14
[52] U.S. Cl. ................................ 204/255; 204/129; 204/263; 204/279; 204/290 R; 252/511; 429/38; 429/39
[58] Field of Search ............... 204/129, 279, 263, 257, 204/252–256, 258, 294, 264–266, 267–270, 295, 296; 429/38, 39, 217; 252/511, 182.1

[56] References Cited

U.S. PATENT DOCUMENTS

| | | | |
|---|---|---|---|
| 3,134,696 | 5/1964 | Douglas et al. ..................... 429/30 |
| 4,057,479 | 11/1977 | Campbell ........................... 204/258 |
| 4,061,601 | 12/1977 | Clary et al. ........................ 252/511 |
| 4,118,294 | 10/1978 | Pellegri ......................... 204/290 F X |
| 4,124,478 | 11/1978 | Tsien et al. ...................... 204/279 X |
| 4,135,995 | 1/1979 | Welch ............................. 204/294 X |

Primary Examiner—John H. Mack
Assistant Examiner—D. R. Valentine
Attorney, Agent, or Firm—I. David Blumenfeld

[57] ABSTRACT

A bipolar current collector-separator for electrochemical cells consists of a molded aggregate of electro-conductive graphite and a thermoplastic fluoropolymer combined in a weight ratio of 2.5:1 to 16:1. The bulk resistivity of such a molded bipolar current collector-separator is less than $4 \times 10^{-3}$ ohm inches ($\Omega$ in.). It has excellent corrosion resistance to a variety of feedstocks such as brine, aqueous HCl, etc. and to various electrolysis products such as caustic, chlorine, hydrogen, etc. In one alternative form the anodic side of a current collector-separator for a water electrolyzer is covered by a thin layer of a passivated metallic foil thus protecting the graphite current collector against attack by oxygen.

13 Claims, 3 Drawing Figures

LOW COST BIPOLAR CURRENT COLLECTOR-SEPARATOR FOR ELECTROCHEMICAL CELLS

This invention relates to a molded, current collecting-separator structure for electrochemical cells and, more particularly, to one utilizing thermoplastic fluoropolymer resin binders for bonding electroconductive particles into a solid current collecting/separator structure.

One class of electrochemical cells which has drawn a great deal of attention in the recent past are cells which utilize a non liquid (i.e. solid) electrolyte in the form of a thin sheet of a polymeric ion exchange resin. One very useful and advantageous form of such a solid polymer electrolyte electrolytic cell, for example, also embodies electrodes, in the form of particles of catalytic material and resin binder, bonded directly to the surface of the ion exchanging solid polymer electrolyte. Such unitary electrode and electrolyte structures represent a major departure in electrolysis or other cells in which the electrodes are customarily physically separated from the ion exchanging polymeric electrolyte. One well known form of a spaced electrode which functions both as an anode and as a current collector is the so called dimensionally stabilized anode (DSA) which consists of a valve metal substrate with a film of a platinum group metal deposited on its surface. Metallic meshes, screens, plates, etc. have also been used as current collectors in conjunction with the cell electrodes in membrane cells. One such arrangement utilizing metallic bipolar grids is illustrated in U.S. Pat. No. 3,134,696, assigned to the assignee of the present invention, which shows fuel cells incorporating dispersed electrodes bonded directly to the surfaces of solid polymer ion exchanging membranes and metallic plate collector-separators with projections on both sides which contact the electrodes.

In an electrolysis cell, the bipolar, current collector-separator is exposed to anolytes such as water (in the case of water electrolysis) brine and hydrochloric acid (in a chlor-alkali system) and to electrolysis products such as wet chlorine and oxygen on the anode side and hydrogen and caustic on the cathode side. In the case of a fuel cell the current collectors are exposed respectively to the fuel gas such as hydrogen or oxidants such as air or pure oxygen.

Metallic bipolar current collectors-separators have been used extensively but they do have a number of short comings. The first of these shortcomings is expense. As pointed previously, they normally include valve metals such as tantalum, niobium, titanium, etc. and alloys thereof which have good corrosion resistance and conductivity but which are costly. Valve metals also have a tendency to passivate by the formation of protective surface oxide layers which are very poor conductors. Hence it is necessary to coat the valve metal with a non-oxide forming material such as a film of one of the platinum group metals which further adds to the cost. As a result, platinized niobium screens, dimensionally stabilized anodes, etc., use costly materials, require difficult and costly manufacturing procedures, and in many ways present problems from a fabrication and cost standpoint.

In addition, although the valve metals and other metals used as current collectors have excellent corrosion properties, their susceptibility to hydrogen embrittlement makes their use quite troublesome in electrolytic cells for the electrolysis of water of hydrochloric acid or any other anolyte in which hydrogen is one of the evolved gases. That is, valve and other metals have a tendency to absorb atomic hydrogen and then form metal hydrides which weaken and embrittle the structure.

Thus, there is a need for a bipolar, current collector-separator which is less expensive than a structure which uses valve or other metals covered with platinum group metals; one which is readily shaped to various configurations, (such as grooves or ribs,) one which can provide multiple point contact with the electrodes as well as good fluid distribution over the surface of an electrode bonded to the membrane; which has good corrosion resistance to electrolysis products and feed stocks; which is not subject to hydrogen embrittlement, and which provides good electrical conductivity.

The use of molded aggregates of conductive particles in a thermosetting phenolic or other polymeric binders has been suggested to provide such low cost, bipolar separators. However, it has been found that such molded aggregates do not have the required corrosion resistance principally because the phenolic or other polymeric binders, are readily attacked by the anolytes and by electrolysis products such as halogens.

In addition, the bulk resistivity of such molded collectors was high thereby introducing voltage drops of 100-200 millivolts per 1000 ASF.

Applicant has found if the bipolar current collector-separator is fabricated of conductive graphite or carbon particles bonded with a thermoplastic, fluoropolymer binder, the current collector has excellent resistance to corrosion. The bulk resistivity ($<4\times10^{-3}$ Ω in.) compares favorably with metallic members; it has good temperature characteristics; excellent bending (flexural) strength; and may be readily manufactured in many configurations at reasonable cost.

It is, therefore, an objective of the invention to provide a corrosion resistant, bipolar, current collector-separator with excellent conductivity which utilizes a thermoplastic fluoropolymer resin binder.

Another objective of the invention is to provide a current conducting, bipolar, separator constituted of a molded aggregate of conductive particles and thermoplastic fluoropolymer binder.

Yet another objective of the invention is to provide a novel electrochemical cell utilizing the novel bipolar separators of the invention.

Other objectives and advantages of the invention will become apparent as the description thereof proceeds.

In accordance with the invention, a multi-ribbed current conducting, bipolar separator is provided which is a molded aggregate of electrically conductive particles, (preferably carbon or graphite), and of a thermoplastic fluoropolymer resin in a weight ratio of 1:2.5 to 1:16 with the molded aggregate having a bulk resistivity of $1-3.5\times10^{-3}$ Ω in. (2.54–8.9 Ω cm).

The novel features which are believed to be characteristic of this invention are set forth with particularity in the appended claims. The invention itself, however, both as to its construction and method of operation together with further objectives and advantages thereof may best be understood by reference to the following description taken in connection with the accompanying drawings in which:

The bipolar current conducting separator of the instant invention is preferably a molded aggregate of conductive particles pressure bonded with a thermoplastic fluoropolymer resin binder. Carbon or graphite are preferred as the conductive particles (although metallic particles may also be used) with the conductive and resin particles being present in a weight ratio between 2.5:1 and 16:1.

The current collector-separator is fabricated by pressure molding a mixture of the conductive particles and the fluoropolymer resin in a mold shaped to produce a collector which has a plurality of projections, preferably elongated ribs, on opposite surfaces of the collector. The ribs on opposite sides of the bipolar collector for reasons presently to be described, are angularly disposed to each other. The weight percentage of the binder can be as low as 6% and still provide good structural integrity at temperatures up to 300° F.

The resistivity in ohm-inches of a graphite-fluoropolymer current collector-separator is less than 4 milliohms/in. for a formulation containing in excess of 25% or more weight of the non-conductive fluoropolymer resin binder. Specifically with the fluoropolymer weight percentage varing from 6–28%, the resistivity varies from $1.2-3.5 \times 10^{-3}$ Ω in. This represents a 0.4 to 0.8 milivolt loss (Ir drop) per 1000 ASF.

The preferred size for the conductive graphite-carbon particles is approximately 44 microns or alternatively of an average size such that 99% of the carbon/graphite particles pass through a 325 mesh sieve.

The fluoropolymer resin is preferably a polyviniledene fluoride which is available commercially from the PennWalts Corporation under its trade name, Kynar. Other fluoropolymer resins such as tetrafluoropolyethelene, etc., may be utilized with equal facility although the polyviniledene fluoride is preferable as it is a low cost material and has a lower molding temperature (T=590–630° F.), than most other fluoropolymers. The commercially available Kynar polyviniledene such as Kynar 461 has a 5 micron average particle diameter with agglomerates of approximately 45 mils in diameter.

Although carbon and graphite particles are prefered, metallic particles may also be used although a molded aggregate utilizing metallic particles would be somewhat susceptible to hydrogen embrittlement although less so than a metallic collector.

Figure 1:
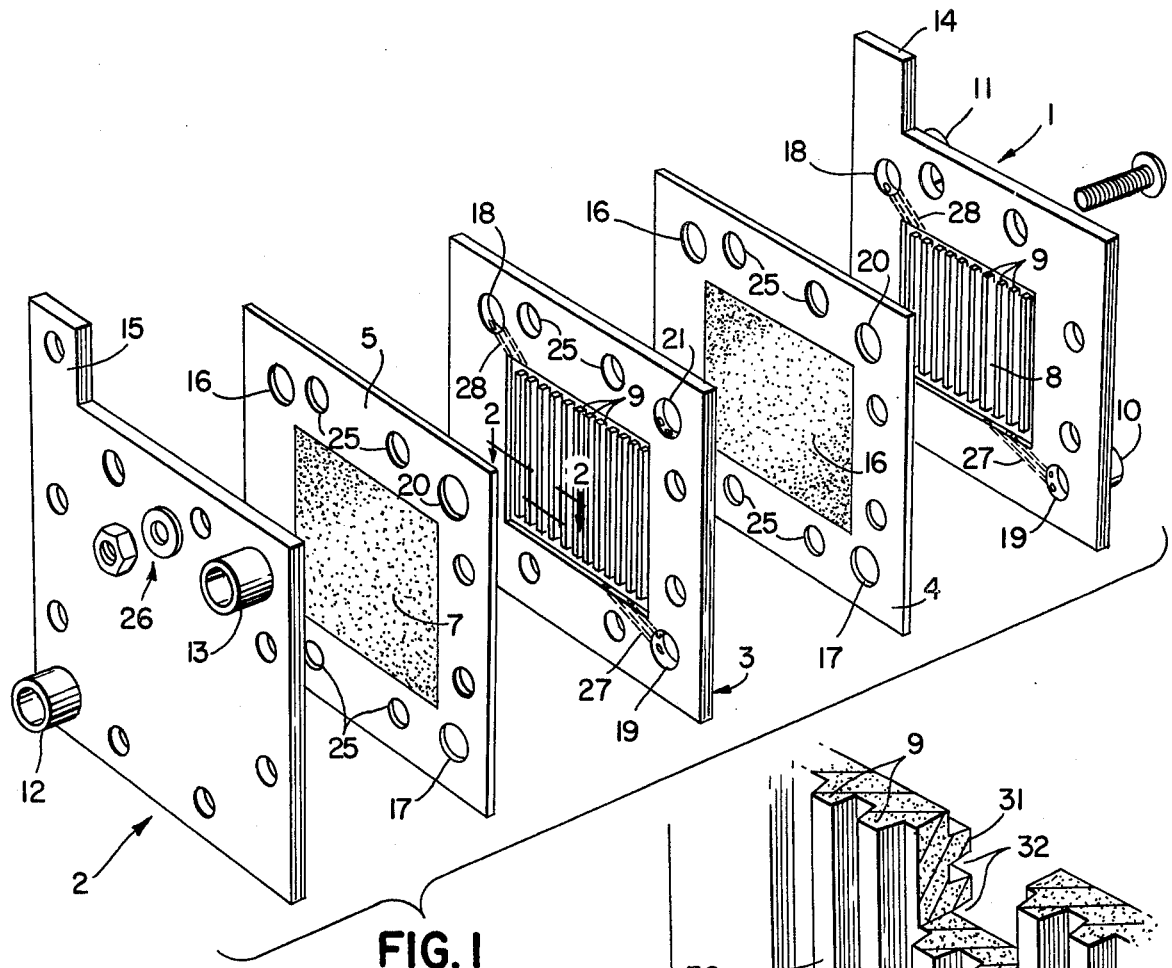
FIG. 1 is an exploded perspective view showing a two unit electrochemical cell employing ion exchange membranes with bonded electrodes and a bipolar separator constructed in accordance with the invention.

Referring now to FIG. 1, a cell assembly is illustrated which comprises two cell units connected in series and utilizing a bipolar, current collector-separator although it is to be understood that any number of cell units can be included in the assembly by the use of additional bipolar separators and membranes. The cell assembly includes an anodic endplate 1 and a cathodic endplate 2, both of which are molded aggregates of electrically conductive graphite particles and a thermoplastic fluoropolymer resin. A molded graphite/fluoropolymer current collector-separator 3 is positioned between the end plates and is separated therefrom by ion exchanging membranes 4 and 5. Cathode electrodes 6 and 7 are bonded to one side of the respective ion exchanging membranes and anode electrodes, not shown, are bonded to the other surface. Electrodes 6 and 7 are porous, gas and liquid permeable bonded mixtures of catalytic particles and a hydrophobic binder. The catalytic particles are preferably those of the platinum group metals either in the form of pure metals or as reduced oxides of the metals. The hydrophobic resin particles are preferably fluorocarbons (polytetrafluoroethylene) such as those sold by Dupont under its trade designation Teflon.

The molded graphite/fluoropolymer anode endplate 1 has a central chamber 8 containing a plurality of generally vertical electrode contacting ribs 9. Anolyte inlet conduit 10 and an anolyte outlet 11 communicate with chamber 8 to introduce the anolyte and remove spent anolyte and electrolysis products. Similarly cathode endplate 2 has a central chamber and corresponding ribs, not shown, which, as well be described later, are angularly disposed with respect to the ribs of the other endplate. Catholyte inlet conduit 12 communicates with the central chamber to bring catholyte into the chamber, while spent catholyte and cathode electrolysis products are removed from the chamber through outlet conduit 13.

Endplates 1 and 2 are provided with tabs 14 and 15 which are respectively connected to the positive and negative terminals of a source of DC power.

Membranes 4 and 5 are cationic ion exchange membranes, and preferably perfluorosulfonic acid membranes of the type sold by the Dupont Corporation under its trade designation "Nafion". Cathode electrode 6 is bonded to one side of the membrane 4 and a similar anode electrode is bonded to the opposite side of the membrane. Similarly, cathode 7 is bonded to one side of membrane 5 of the second cell and an anode electrode, not shown, is bonded to the opposite side. The catalytic cathode may be of graphite, platinum group metals such as platinum, ruthenium, rhodium, palladium, iridium, osmium or alloys thereof, or iron, cobalt, copper, silver, and gold. The catalytic anode may be of platinum group metals such as platinum, ruthenium, rhodium, rodium, etc., as well as oxides, or reduced oxides, or alloys thereof, alone or with other platinum group metals, their oxides, reduced oxides, or in combination with valve group metals (Tl, Ta, Nb, Zn, Hf, etc.) and oxides or reduced oxides of such valve group metals.

Openings 16 and 17 located in opposite corners of membranes 4 and are aligned with anode inlet and outlet conduits 10 and 11 and with openings 18 and 19 in current collector 3 to facilitate passage of the anolyte into the anode chamber and to remove spent anolyte and anode electrolysis products. Openings 20 in membranes 4 and 5 and opening 21 in bipolar collector 3 are aligned with catholyte outlet conduit 13 and similar openings, not shown, are aligned with catholyte inlet conduit 12 to facilitate passage of catholyte into the cathode chamber and removal of spent catholyte and cathode electrolysis products. Endplates 1 and 2, membranes 4 and 5, and bipolar current collector 3 are each provided with a plurality of openings 25 through which assembling tie-rods or bolts 26 pass. The tie-rods or bolts may be of an insulating material or alternatively are covered with plastic sleeves or sheets to insulate the metallic tie rods as well as the bolts and nuts from the conductive endplates and the bipolar separator.

When assembled the plurality of conductive projections in the anode and cathode chambers, projections which take the form of elongated ribs 9 contact the electrodes bonded to the membranes at a plurality of points while at the same time providing fluid distribution channels for the anolyte and catholytes and for the gaseous electrolysis products such as hydrogen, oxygen, chlorine, etc.

During operation, an aqueous anolyte such as brine, aqueous hydrogen chloride, or water, etc. from conduit 10 is introduced into anode chamber 8 of the first cell unit through inlet passages 27 which communicate between opening 18 in end plate 1 and the central anode chamber 8. The anolyte is introduced under pressure and passes upward through the channels formed by ribs 9 and is electrolyzed at the anode electrode, not shown, bonded to the other side of membrane 4. The anolyte also passes through opening 17 in membrane 4 into opening 19 of current collector 3 and through passages 27 into the anode chamber of the second cell unit. The anolyte moves through the fluid distribution channels formed between current conducting ribs 9 which contact the anode electrode, not shown, bonded to the other surface of ion exchanging membrane 7. The depleted anolyte and gaseous electrolysis product such as oxygen, chlorine, etc. produced in the anode chambers are removed from the cells through passages 28 which communicate with outlet conduit 11. brine electrolysis, is introduced into the cathode chambers through inlet conduit 12 passing through cathode endplate 2 and passes through the horizontal fluid distribution passageways, now shown, in endplate 2 and similar passages on the other side of current collecting-separator 3. The cathode electrolysis products, such as caustic and hydrogen in the case of brine electrolysis, hydrogen in the case of aqueous hydrogen chloride or water electrolysis, are evacuated from the cathode chamber via outlet conduit 13.

During electrolysis gas is evolved at the anode ($Cl_2+O_2$) along with cations, sodium ($Na^+$) in the case of brine electrolysis, hydrogen ($H^{3O}$) in the case of water or HCl electrolysis. The cations migrate through the ion transporting membranes to the cathode electrode on the other side of the membrane and are either discharged as hydrogen gases, (in the case of HCl or water electrolysis) or combine with hydroxyl ions to form caustic (in the case of brine electrolysis). These electrolysis products, are, as pointed out above, then removed through outlet conduit 13.

Figure 2:
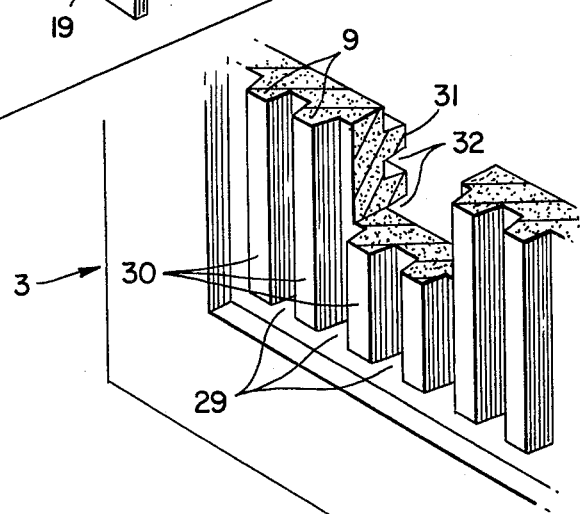
FIG. 2 is a partially broken away perspective of the bipolar current collector of FIG. 1 along line AA of FIG. 1.

As may be seen more clearly in FIG. 2, vertical ribs 9 of collector 3 (and of endplate 1) form a plurality of vertical anolyte fluid distribution channel 29 through which the anolyte passes upwardly and into contact with the electrodes bonded to the membrane and through which the evolved electrolysis product such as chlorine, oxygen, etc., pass upwardly to the outlet conduit. Each of the ribs has a flattened current conducting surface 30 which contacts the electrode and through which the current flows into the electrode.

The other side of bipolar collector 3 contains a similar central chamber which includes a plurality of elongated current collecting projections in the form of horizontally disposed ribs 31. Ribs 31 similarly, defined a plurality of distribution channel 32 for any incoming catholyte and for a cathode electrolysis product such as caustic, and hydrogen. Ribs on opposite side of the molded bipolar current collector are angularly disposed to each other so that the bipolar current collectors in a multicell arrangement provide firm support for the ion transporting membranes. In a multi-cell assembly the ion transporting membranes in any given cell are supported on opposite sides by current collecting ribs of bipolar current collectors or of an endplate. It has been found that the most effective support of the membranes is by ribs which are angularly disposed to each other so as to provide a plurality of supporting points for the membrane at the intersection of the elongated ribs on opposite sides of the membrane. This provides support at a plurality of points without wrinkling or corrugating the membrane and without requiring precise alignment of the ribs. That is, if the ribs on opposite sides of the current collector not angularly disposed to each other, proper support of a membrane between two sets of ribs requires precise alignment of the ribs since any misalignment tends to produce a meshed tooth effect, which deforms the membrane. The angularly disposed rib construction provides a simple, effective support mechanism for the membranes while eliminating or minimizing the risk of deforming the membranes.

Figure 3:
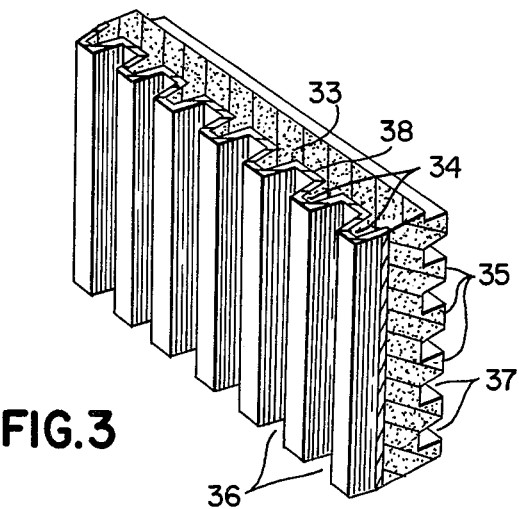
FIG. 3 is a partial sectional perspective of an alternative construction of bipolar separator having a metallic foil on one side hereof.

The molded graphite/fluoropolymer bipolar collectors illustrated in FIGS. 1 and 2 have both of the surfaces exposed directly to the anolyte and catholyte fluids as well as the electrolysis product. The polyviniledene fluoropolymer-graphite molded composition has been found to be corrosion resistant to such anolytes as brine, HCl and such electrolysis products as chlorine and other halogens, hydrogen, caustic, etc. However, in the case of water electrolysis the oxygen evolved at the anode has a tendency to attack the graphite or carbon particles forming the current collector. As a result it has been found preferable in the case of bipolar current collectors for water electrolyzers, to modify the bipolar collector so that the anode sides thereof are covered by a thin metallic foil which protects the fluoropolymer/graphite surface from the oxygen generated at the anode. FIG. 3 illustrates a partially broken away sectional view of a bipolar collector of this sort. The molded collector-separator aggregate 33 contains a plurality of a vertical rib 34 on the anode side of the collector and a plurality of horizontally disposed ribs 35 on the cathode side. Ribs 34 define a plurality of vertical anolyte distribution passages 36 while the horizontal ribs 35 define similar catholyte fluid distribution channels 37. The anode side of bipolar collector 33 is covered by a conductive metallic foil 38 which anode protective film 38 blocks oxygen evolved at the anode and passing through fluid distribution channels 36 from the graphite/fluoropolymer collector thereby preventing the oxygen from attacking the graphite particles and corroding the bipolar collector. Protective foil 38 is attached to the molded aggregate by a combination of an adhesive and pressure. Thus, one side of the foil as well as the surface of the collector is coated with a thin layer of polyviniledene or any other suitable adhesive and the foil is pressed against the surface and into the channels and the temperature of 400°–420° F. The polyviniledene acts as an adhesive between the metallic foil and the bonded aggregate.

Foil 38 is a foil which is preferably covered by a thin non-oxide forming film. The anode protective foil is exposed to oxygen and since most metals will form oxide layers which are non-conductive, the conductive foil must either be of a metal which does not passivate or its surface must be covered by a non-oxide forming film. The film may be electroplated, sputtered or otherwise deposited on the anodic protective foil. The protective foil is preferably of titanium or other metals such as Niobium, or Tantalum. The non-oxide forming film is preferably a noble metal of the platinum group. The metal foil may be from 0.5–5 mils thick with a 1 mil foil being prefered. A loading of 1.6 milligrams of the platinum group metal per square inch (0.25–1.6 mg/in$^2$) is adequate to prevent passivation of the Titanium foil while at the same time maintaining excellent conductivity.

It will be noted that the cathode side of the bipolar collector which is exposed to catholytes such as water, dilute caustic as well as electrolysis products such as concentrated caustic and hydrogen are not covered by any protective metallic foil and is of the same configuration and construction as the collector illustrated in FIGS. 1 and 2. However, in the case of water electrolysis it is prefered that the anode side of the collector be covered by an anodic protective layer which will protect the graphite or carbon particles against attack by oxygen.

EXAMPLES

The examples set forth below describe two molding procedures for fabricating a current collector-separator constituted of a molded aggregate of conductive graphite particles and a thermoplastic fluoropolymer. The current collectors were tested to determine physical and electrical characteristics such as flexural strength, resistivity at various temperatures and for different compositions. Thereafter, the current collectors were operated in a plurality of different electrolysis cells.

EXAMPLE I

A mixture of a fluoropolymer, polyviniledene Kynar grade 461 obtained from PennWalt Corporation was combined with graphite powder (Union Carbide Grade GP195) in a 1:4 weight ratio. The polyviniledene had an average particle diameter of 5 microns and conglomerated in sizes approximately 45 mil. The graphite particles had a 44 micron average diameter specified as 99% passing through a 325 mesh sieve. The mixture was poured into a blender and blended for 25 minutes to provide a thoroughly homogenized mixture of graphite particles and of the thermoplastic binder. The mixture was then poured into a mold in the shape of the ribbed current collector illustrated in FIG. 1. The powder mixture in the mold was subjected to an initial compression of 2000 psi and heat was applied to bring the mixture to 300° F. The pressure was then reduced to 300 psi and the temperature raised to 400° F. When the mixture reached 400° F. the pressure was increased to 2000 psi. Thereafter, the temperature was reduced to 290° F. for approximately 5 minutes and the pressure reduced to 300 psi and the molded aggregate allowed to cool to room temperature.

EXAMPLE II

In an alternative mold cycle the pressures were 4000 psi and 500 psi instead of 2000 and 300, with all other sequences being the same as described above.

The mold thickness was 150 mils at its thinnest portion and 250 mils at its thickest portion. Collectors with varying fluoropolymer (i.e. Kynar polyviniledene) weight % were molded by each of the two mold cycles. Flexural strength $\sigma$ in psi (i.e. maximum stress) was measured as a function of binder content. The bulk resistivity in $\Omega$ inches was also measured for varying fluoropolymer weight percentages.

Tables 1 and 2 illustrate the flexural strength data for graphite/thermoplastic fluoropolymer current collectors:

TABLE I

Mold Cycle I - p - 2000/300 PSI - Temperature Cycle During Molding 300° F. → 400° F. → 390° F. → Ambient Room

| Wt % Binder | T (°F.) | $\sigma$ (PSI) |
|---|---|---|
| 14 | 180 | 1350 |
| 18 | 180 | 3800 |
| 20 | 180 | 4350 |
| 22 | 180 | 3900 |
| 26 | 180 | 2900 |
| 14 | 300 | 1000 |
| 18 | 300 | 2150 |
| 20 | 300 | 2150 |
| 22 | 300 | 1800 |
| 26 | 300 | 1300 |

TABLE II

Mold Cycle II - 4000/500 psi - Temperature Cycling During Molding 300° F. → 400° F. → 390° F. → Room Temp.

| Wt. % Binder | T (°F.) | $\sigma$ (PSI) |
|---|---|---|
| 14 | 180 | 1350 |
| 18 | 180 | 3450 |
| 20 | 180 | 3650 |
| 22 | 180 | 3250 |
| 26 | 180 | 2200 |
| 14 | 300 | 1000 |
| 18 | 300 | 1750 |
| 20 | 300 | 1750 |
| 22 | 300 | 1600 |
| 26 | 300 | 900 |

It is apparent from this data that the molded graphite/thermoplastic polyviniledene current collector has excellent flexural characteristics at operational temperatures up to 300° F. The total bending strength at 300° F. is in the range of 1–2 K psi and 1½ to 4½ K psi at 180° F. It is also apparent from the above data that the flexural strength is maximum with a 20% weight content of the binder, i.e. a 4:1 weight ratio of graphite and fluoropolymer. However, even at weight ratio compositions other than 1:4 the flexual strength of the current collector is such that it can be readily operated at 600 psi at 300° F.

The resistivity in $\Omega$ inches of the molded current collector-separators was then determined as a function of weight percentages of the binder. Tables 3 and 4 illustrate the resistivity date for different molding cycles and for different amounts of binder.

TABLE 3

Same Mold Cycle as for Table I; Temperature 400–420° F.

| % Binder | Resistivity ($\Omega$ -in.) |
|---|---|
| 7 | $1.93 \times 10^{-3}$ |
| 14 | $2.06 \times 10^{-3}$ |
| 18 | $2.30 \times 10^{-3}$ |
| 20 | $2.46 \times 10^{-3}$ |
| 22 | $2.68 \times 10^{-3}$ |
| 26 | $3.6 \times 10^{-3}$ |

TABLE 4

Same Mold Cycle as Table II; Temperature 400–420° F.

| % Binder | Resistivity ($\Omega$ -in.) |
|---|---|
| 7 | $1.18 \times 10^{-3}$ |
| 14 | $1.42 \times 10^{-3}$ |
| 18 | $1.73 \times 10^{-3}$ |
| 20 | $2.00 \times 10^{-3}$ |
| 22 | $2.32 \times 10^{-3}$ |

TABLE 4-continued

Same Mold Cycle as Table II; Temperature 400–420° F.

| % Binder | Resistivity (Ω -in.) |
| --- | --- |
| 26 | $3.3 \times 10^{-3}$ |

As can be seen from Tables 3 and 4 the bulk resistivity of the molded current collector is less than $4 \times 10^{-3}$ Ω in. for all conditions and ranges between $1.2–3.6 \times 10^{-3}$ Ω inches.

Electrolysis cells were then prepared utilizing molded graphite/polyviniledene separators and endplates. The cells were utilized for the electrolysis of brine to produce chlorine and caustic; the electrolysis of aqueous hydrochloric acid to produce chlorine and hydrogen; and the electrolysis of water to produce hydrogen and oxygen. In all cases a persulfonic acid membrane of the type sold by Dupont under the tradename Nafion was used. In the case of water electrolysis the cathode electrocatalyst was platinum black with the anode electrocatalyst was reduced oxides of platinum-iridium. In the case of both brine and HCl electrolysis the cathode electrode included was a platinum black whereas the anode electrode were reduced oxides of ruthenium-iridium.

The cells were utilized in each of these different electrolysis arrangements on the following operational conditions:

H₂O electrolysis

An 18.5 weight % Kynar collector was fabricated and the cell operated under the following conditions:
Electrolyte—H₂O
Temperature—300° F.
Current Density—1000 ASF
Unit Cell Voltage—1.74

BRINE ELECTROLYSIS—18.5 wt % Kynar

Electrolyte—Sat NaCl at 320 g/l
Temperature—190° F.
Current Density—300ASF
Unit Cell Voltage—3.65 V
Current Efficiency—88%

HCl ELECTROLYSIS—18.5 wt % Kynar

Electrolyte—8 Molar HCl
Temperature—135° F.
Current Density—600 ASF
Unit Cell Voltage—1.66 volts
Current Efficiency—99%

In all instances the cell operated satisfactorily with excellent cell voltages, no observable corrosion, and with very little voltage drop due to the molded graphite fluoropolymer current collector-separator arrangement.

While the number of specific embodiments of this invention had been shown and described above, it will, of course, be understood that the invention is not limited thereto since many modifications both in the structure and the arrangement instrumentalities employed therein may be made. It is contemplated by the appended claims to cover any such modification which fall within the true scope and spirit of this invention.

What is claimed as new and desired to be secured by a Letter of Patent by the United States is:

1. A bipolar current collecting, fluid distributing, cell separating element for electrochemical cells for conducting current from the anode electrode of one cell unit to cathode electrode of the adjacent cell unit comprising:

(a) a pressure molded aggregate of electrically conductive carbon/graphite particles and thermoplastic fluorocarbon polymer resin particles in a weight ratio of 2.5:1 to 16:1 whereby said molded aggregate has a bulk resistivity which is less than $4 \times 10^{-3}$ ohm/inch,
    (b) said molded aggregate having a fluid impervious main body, at least one recessed chamber on one side of said main body and a plurality of spaced, conductive projections extending from the base of said chamber for contacting and permitting current flow between the electrode of adjacent cell unit,
    (c) means communicating with said recessed chambers to permit introduction and removal of fluids.

2. The current collecting bipolar, cell separating element according to claim 1 wherein said main body has recessed chambers on opposite sides thereof and a plurality of spaced conductive projections extending from the bases of both chambers to form a plurality of fluid distributing channels on opposite sides thereof said projections contacting and conducting current between electrodes of adjacent cell units.

3. The current collecting-fluid distributing element according to claim 2 wherein the spaced, conductive projections in opposite chambers are angularly disposed with respect to each other.

4. The current collecting-fluid distributing element of claim 1 wherein the fluoropolymer is polyviniledene fluoride.

5. The current collecting-fluid distributing element according to claim 4 wherein the weight ratio of carbon/graphite to fluoropolymer is 4:1.

6. The current collecting-fluid distributing element according to claim 3 wherein the fluoropolymer is polyviniledene fluoride.

7. In an electrochemical cell comprising an ion transporting membrane separating the cell into anode and cathode chambers, anode and cathode electrodes bonded to opposite sides of said membrane, current collecting-fluid distributing elements contacting the anode and cathode electrodes, the improvement comprising utilizing the current collection-fluid separating element of claim 1 as the element contacting the anode and cathode.

8. The cell according to claim 7 where the spaced conductive projections contacting the anode and cathode electrodes respectively are angularly disposed to each other.

9. The cell according to claim 8 where the fluoropolymer is polyviniledene fluoride.

10. The cell according to claim 9 wherein the weight ratio of carbon/graphite to fluoropolymer is 4:1.

11. An electrochemical cell assembly having a plurality of cell units each unit containing an ion transporting membrane and anode and cathode electrodes bonded to opposite sides of the membrane with the individual cell units separated by a current collecting-fluid distributing element, the improvement comprising using the element of claim 3 as to separate the units.

12. The electrochemical cell assembly according to claim 11 wherein the fluoropolymer is polyviniledene fluoride.

13. A water electrolysis cell comprising an ion transporting membrane separating the cell into anolyte and catholyte chambers, anode and cathode electrodes bonded to opposite sides of said membrane, current collecting-fluid distributing elements contacting the anode and cathode, the improvement comprising the current collecting element of claim 1 in which the element contacting the anode is covered by a non-oxidizable, current conducting protective foil.

* * * * *